(12) United States Patent
Steil

(10) Patent No.: US 11,211,653 B2
(45) Date of Patent: Dec. 28, 2021

(54) BATTERY MODULE AND USE OF A PROPAGATION PROTECTION ELEMENT

(71) Applicant: Robert Bosch GmbH, Stuttgart (DE)

(72) Inventor: Michael Steil, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 15/953,758

(22) Filed: Apr. 16, 2018

(65) Prior Publication Data

US 2018/0309177 A1 Oct. 25, 2018

(30) Foreign Application Priority Data

Apr. 19, 2017 (DE) .................. 10 2017 206 560.5

(51) Int. Cl.
| | |
|---|---|
| *H01M 10/6595* | (2014.01) |
| *H01M 10/613* | (2014.01) |
| *H01M 10/659* | (2014.01) |
| *H01M 50/20* | (2021.01) |
| *H01M 50/116* | (2021.01) |
| *H01M 10/625* | (2014.01) |

(52) U.S. Cl.
CPC ..... *H01M 10/6595* (2015.04); *H01M 10/613* (2015.04); *H01M 10/625* (2015.04); *H01M 10/659* (2015.04); *H01M 50/116* (2021.01); *H01M 50/20* (2021.01); *H01M 2200/10* (2013.01); *H01M 2220/20* (2013.01)

(58) Field of Classification Search
CPC ........... H01M 10/6595; H01M 10/613; H01M 10/625; H01M 10/659; H01M 10/65; F25D 5/02; H04B 1/036
See application file for complete search history.

(56) References Cited

U.S. PATENT DOCUMENTS

| | | | |
|---|---|---|---|
| 9,608,686 B1* | 3/2017 | Coulter | F25D 5/02 |
| 2017/0033342 A1* | 2/2017 | Ueda | H01G 11/24 |
| 2017/0214103 A1* | 7/2017 | Onnerud | H01G 11/78 |
| 2018/0149402 A1* | 5/2018 | Srivastava | F25J 1/0022 |

FOREIGN PATENT DOCUMENTS

| | | |
|---|---|---|
| CN | 106356588 A | 1/2017 |
| DE | 102013219666 A1 | 4/2015 |
| EP | 2346111 A1 | 7/2011 |
| JP | 2013178909 A | 9/2013 |
| WO | 2015179597 A1 | 11/2015 |

OTHER PUBLICATIONS

Hahn et al. EP 2346111. Jul. 16, 2014. English translation. (Year: 2014).*

* cited by examiner

*Primary Examiner* — James Lee

(74) *Attorney, Agent, or Firm* — Michael Best & Friedrich LLP

(57) ABSTRACT

A battery module comprising at least one battery cell (2), wherein the battery module (1) further comprises a propagation protection element (3) which is connected in a thermally conductive manner to the battery cell (2) and which is designed in such a way that, when a specific value for a temperature of the at least one battery cell (2) is exceeded, an endothermic process which is being executed within the propagation protection element (3) absorbs heat which is given off by the at least one battery cell (2).

18 Claims, 1 Drawing Sheet

BATTERY MODULE AND USE OF A PROPAGATION PROTECTION ELEMENT

BACKGROUND OF THE INVENTION

The invention proceeds from a battery module having at least one battery cell. Furthermore, the invention also relates to the use of a propagation protection element in a battery module for the purpose of cooling a battery cell which is in a safety-critical temperature range.

The prior art discloses that battery modules can consist of a plurality of individual battery cells which can be electrically conductively connected to one another in series and/or in parallel.

In order to operate battery cells in a preferred temperature range, it is further known, for this purpose, that battery modules can comprise a cooling system which is particularly intended to ensure that the battery cells do not exceed a prespecified temperature.

If, however, the battery cells exceed this prespecified safety-critical temperature, this can lead to thermal runaway, which is also called "propagation", of the battery cell, this leading to considerable safety risks.

SUMMARY OF THE INVENTION

The battery module according to the invention has the advantage that a battery module can be provided with reliable protection against propagation.

As a result, it is possible to reliably transfer a battery cell which exceeds a safety-critical temperature back to a non-critical temperature range.

To this end, a battery module comprising at least one battery cell is provided.

In this case, the battery module further comprises a propagation protection element which is connected in a thermally conductive manner to the at least one battery cell.

In this case, the propagation protection element is designed in such a way that, when a specific value for a temperature of the at least one battery cell is exceeded, an endothermic process is executed within the propagation protection element.

In this case, this endothermic process absorbs heat which is given off by the at least one battery cell as the process is being executed.

Advantageous developments of and improvements to the apparatus are possible owing to the measures presented in the dependent claims.

At this point, propagation is intended to be understood to mean prevention of further heating of a battery cell which exceeds a specific, safety-critical temperature.

In this way, said battery cell can be transferred back to a non-critical state and thermal runaway of the battery cell can be prevented.

Furthermore, at this point, propagation is also intended to mean prevention of heating of a battery cell which is arranged adjacent to a battery cell which has exceeded a specific, safety-critical temperature.

In particular, the invention provides the advantage that the propagation protection element can be used in addition to an existing cooling system, so that the cooling system does not have to be overdimensioned in such a way that it can also prevent propagation.

Therefore, in this way, a simpler design of the battery module is possible overall.

The propagation protection element is advantageously arranged so as to be in direct mechanical contact with the at least one battery cell.

In particular, this is also intended to be understood to mean that the housing of the propagation protection element in which the endothermic process takes place is arranged so as to be in direct mechanical contact with the at least one battery cell.

This provides the advantage that heat can be transmitted to the propagation protection element in a reliable manner and directly from the at least one battery cell.

As a result, safety of the battery module can be further increased.

According to a first advantageous aspect of the invention, the propagation protection element contains a phase-change material.

At this point, a phase-change material is intended to be understood to mean a material of the kind which changes its state of aggregation from a first state of aggregation to a second state of aggregation with the absorption of heat, which is transmitted in particular from the at least one battery cell to the propagation protection element, at a specific temperature and a specific pressure, without changing the temperature.

Therefore, here, the change in the state of aggregation of the phase-change material is intended to be understood to mean an endothermic process. By way of example, the state of aggregation can change from solid to liquid. However, it is also possible, for example, that the state of aggregation changes from solid to solid, wherein the first state of aggregation is intended to be understood to mean a first lattice structure of a crystal and the second state of aggregation is intended to be understood to mean a second lattice structure of a crystal.

It goes without saying that all further phase-change materials which change their state of aggregation with the absorption of heat at a specific temperature can also be used as phase-change materials for the propagation protection element.

According to a second advantageous aspect of the invention, the propagation protection element comprises a plurality of substances which, when the specific value for the temperature of the at least one battery cell is exceeded, react in an endothermic manner with one another to form at least one further substance.

In this case, the heat which is given off by the at least one battery cell and which said battery cell transmits to the propagation protection element when a specific, safety-critical value for the temperature is exceeded can serve as activation energy for the reaction of the plurality of substances to form at least one further substance.

In this case, the subsequently proceeding endothermic reaction can absorb the heat given off by the at least one battery cell to the propagation protection element, as a result of which reliable transfer of the at least one battery cell to a non-critical state is possible.

According to a third advantageous aspect of the invention, the propagation protection element comprises at least one substance which, when the specific value for the temperature of the at least one battery cell is exceeded, decomposes in an endothermic manner to form at least two further substances.

Here, the heat which is transmitted from the at least one battery cell to the propagation protection element can serve as activation energy for the endothermic decomposition of the at least one substance, wherein the subsequently proceeding endothermic decomposition can absorb the heat given off by the at least one battery cell.

As a result, it is possible to reliably transfer the at least one battery cell to a non-critical state owing to the endothermic decomposition of the at least one substance proceeding within the propagation protection element.

In this case, the propagation protection element can comprise, in particular, a hydroxide. By way of example, the propagation protection element can comprise lithium hydroxide, sodium hydroxide, calcium hydroxide, potassium hydroxide or aluminum hydroxide in this case.

In this case, the propagation protection element can comprise, in particular, a carbonate. By way of example, the propagation protection element can comprise calcium carbonate, lithium carbonate, sodium carbonate or magnesium carbonate in this case.

In this case, the propagation protection element can comprise, in particular, a hydrogen carbonate. By way of example, the propagation protection element can comprise sodium hydrogen carbonate.

In this case, the propagation protection element can comprise, in particular, a hydrate salt.

It should be noted at this point that it is of course possible to combine the first, second and third advantageous aspects of the invention with one another.

It is expedient when the propagation protection element partially encapsulates the at least one battery cell.

In this case, the propagation protection element can completely encapsulate, for example, the side face of a round cell and not cover the bottom face and also the top face on which voltage taps of the round cell are formed.

Furthermore, the propagation protection element can, for example, also encapsulate the four side faces of a prismatic cell and not cover the bottom face and the top face which is situated opposite the bottom face and on which voltage taps of the prismatic cells are arranged, wherein it is also possible that the bottom face is additionally further encapsulated by the propagation protection element.

Furthermore, it is also expedient when the propagation protection element completely encapsulates the at least one battery cell. In this case, the propagation protection element can, for example, additionally further have bushings for voltage taps of the at least one battery cell.

At this point, an encapsulation is intended to be understood to mean, in particular, the covering of a surface of the at least one battery cell by the propagation protection element.

The at least one battery cell can advantageously also have an encapsulation within which the propagation protection element is accommodated.

In this case, the housing of the battery cell for example can form the encapsulation, wherein this is intended to be understood to mean that the encapsulation is an integral constituent part of the housing of the at least one battery cell.

By way of example, the encapsulation can in this case have an interior space in which the phase-change material according to the first aspect of the invention, the plurality of substances according to the second aspect of the invention and/or the at least one substance according to the third aspect of the invention are accommodated.

As a result, a battery module comprising a propagation protection element can be provided in a simple manner, wherein the propagation protection element can be integrated, in particular, into the housing of the battery cell.

Furthermore, the invention also relates to the use of a propagation protection element in a battery module.

Furthermore, the invention also relates to a method of protecting a battery module against propagation, the battery module having at least one battery cell, the method comprising providing a propagation protection element in the battery module, and when a specific safety-critical value for a temperature of at least one battery cell of the battery module is exceeded, executing an endothermic process within the propagation protection element, such that the endothermic process absorbs heat which is given off by the at least one battery cell, for the purpose of cooling the battery cell.

In this case, the battery module is, in particular, a battery module according to the invention which has just been described comprising a propagation protection element which has also just been described.

In this case, the propagation protection element can be, in particular, a propagation protection element which is designed according to the first aspect of the invention and comprises a phase-change material.

In this case, the propagation protection element can be, in particular, a propagation protection element which is designed according to the second aspect of the invention and comprises a plurality of substances which react with one another in an endothermic manner to form a further substance.

In this case, the propagation protection element can be, in particular, a propagation protection element which is designed according to the third aspect of the invention and comprises at least one substance which decomposes in an endothermic manner to form two further substances.

In this case, the propagation protection element for use in a battery module is designed in such a way that, when a specific value for a temperature, which corresponds to a safety-critical value in particular, of at least one battery cell of the battery module is exceeded, an endothermic process is executed within the propagation protection element.

In this case, the endothermic process can absorb the heat which is given off by the at least one battery cell.

Therefore, the propagation protection element in the battery module can be used for the purpose of cooling a battery cell which has a value for the temperature which lies above a specific safety-critical temperature value for the battery cell.

It should once again be noted at this point that the propagation protection element is preferably intended to serve only for the purpose of cooling a battery cell which has exceeded a safety-critical value for the temperature and does not serve for the purpose of taking over cooling of the battery cells during a non-critical safety state.

A cooling system of the battery module can in particular be used for controlling the temperature of the battery module in that instance.

In the case of the propagation protection elements which have just been described and which are designed, in particular, according to the second advantageous aspect or the third advantageous aspect, it may be advantageous that the battery module comprises a control unit which identifies that the endothermic process within the propagation protection element has been executed.

In particular, since the endothermic process is irreversible or a battery cell is no longer functional, identifying the execution of the endothermic process may be advantageous.

By way of example, a temperature sensor can be arranged on the propagation protection element or within the propagation protection element for this purpose, said temperature sensor identifying that a specific temperature has been exceeded, wherein the temperature corresponds, in particular, to a temperature starting from which the endothermic process is executed.

By way of example, a pressure sensor can be arranged within the propagation protection element for this purpose, said pressure sensor identifying a change in the pressure.

An embodiment of this kind is advantageous particularly in the case of endothermic reactions in which a gas is produced.

Furthermore, it is advantageous when the propagation protection element has a degassing valve which opens when a specific pressure prevailing within the propagation protection element is exceeded and can therefore discharge gases which are produced in the propagation protection element as the endothermic reaction proceeds.

Heating of the propagation protection element owing to an increase in pressure can be prevented in this way.

It should be noted at this point that identifying opening of the degassing valve can also be used for identifying the execution of the endothermic process.

A battery module according to the invention can be used both for batteries in electric vehicles, hybrid vehicles and plug-in hybrid vehicles and also in mobile entertainment and communication devices as well as in stationary energy stores and energy stores for medical purposes, such as intracorporeal batteries for example.

BRIEF DESCRIPTION OF THE DRAWINGS

Exemplary embodiments of the invention are illustrated in the drawings and described in greater detail in the following description.

In the drawings

DETAILED DESCRIPTION

Figure 1:
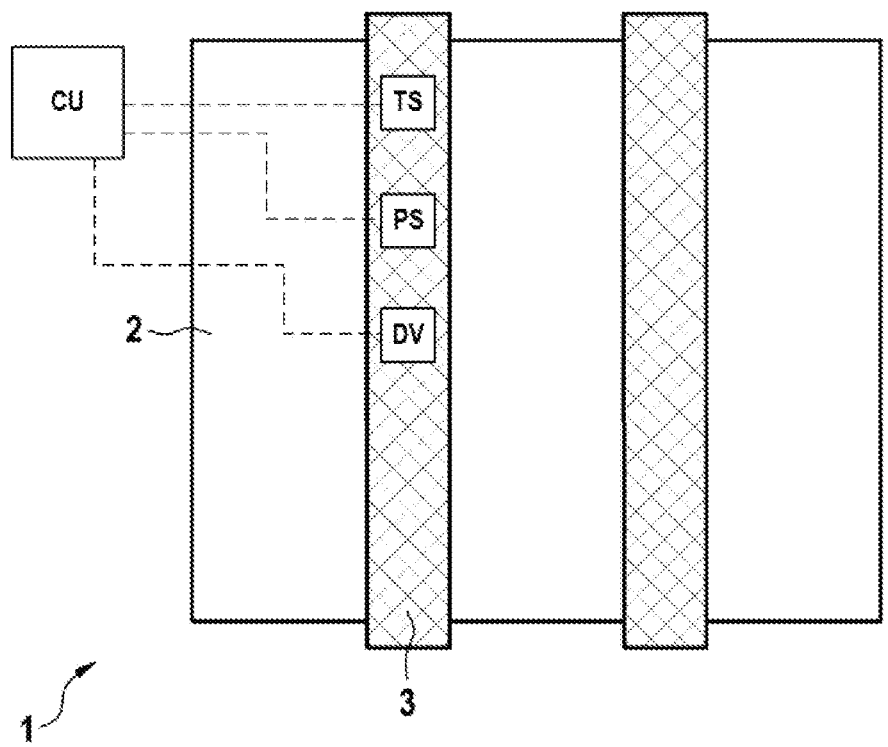
FIG. 1 schematically shows a battery module comprising a propagation protection element, and FIG. 2 schematically shows a profile of a temperature within the propagation protection element over the operating period of the battery module.

FIG. 1 schematically shows a battery module 1 which comprises battery cells 2 and propagation protection elements 3.

In this case, the propagation protection elements 3 are thermally conductively connected to at least one battery cell 2 in each case.

In particular, the propagation protection elements 3 are arranged so as to be in direct mechanical contact with the respective battery cells 2.

As a result, heat can be transmitted from the battery cells 2 to the respective propagation protection elements 3.

In this case, the propagation protection elements 3 are formed in such a way that an endothermic process can be executed within the respective propagation protection element 3.

In one embodiment, the battery module comprises a control unit CU which identifies that the endothermic process within the propagation protection element 3 has been executed.

In particular, since the endothermic process is irreversible or the battery cell 2 is no longer functional, identifying the execution of the endothermic process may be advantageous.

In one embodiment, a temperature sensor TS is arranged on the propagation protection element 3 or within the propagation protection element 3 for this purpose, said temperature sensor TS identifying that a specific temperature has been exceeded, wherein the temperature corresponds, in particular, to a temperature starting from which the endothermic process is executed.

In one embodiment, a pressure sensor PS is arranged within the propagation protection element 3 for this purpose, said pressure sensor PS identifying a change in the pressure.

An embodiment of this kind is advantageous particularly in the case of endothermic reactions in which a gas is produced.

Furthermore, in one embodiment, the propagation protection element 3 has a degassing valve DV which opens when a specific pressure prevailing within the propagation protection element 3 is exceeded and therefore discharges gases which are produced in the propagation protection element 3 as the endothermic reaction proceeds.

Heating of the propagation protection element 3 owing to an increase in pressure is prevented in this way.

Identifying opening of the degassing valve DV is used for identifying the execution of the endothermic process.

Figure 2:
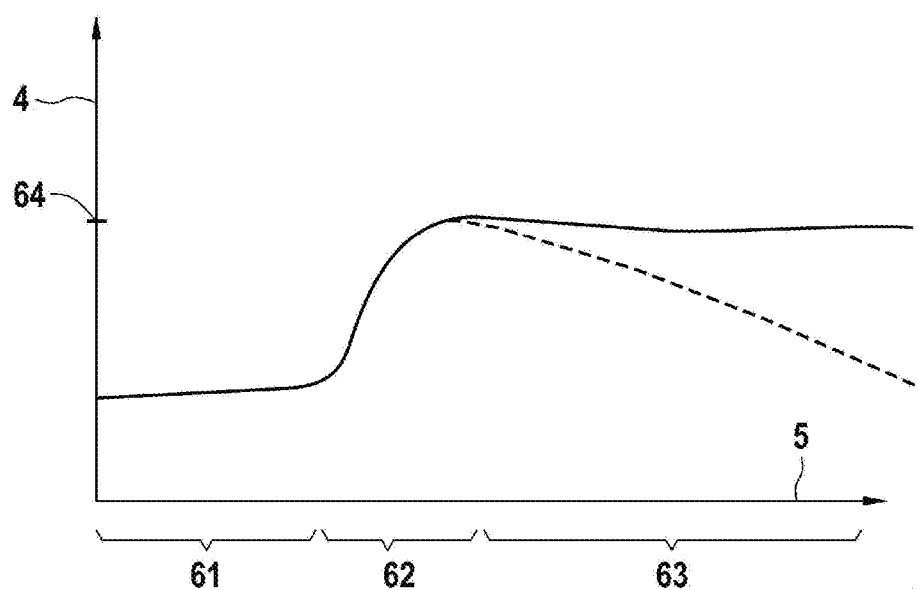

FIG. 2 schematically shows a profile of a temperature 4 of the propagation protection element 3 over the operating period 5 of the battery module 1.

In this case, the profile shown in FIG. 2 has a first region 61 of the operating period 5, within which first region the temperature 4 of the propagation protection element 3 and therefore approximately also the temperature of the respective battery cell 2 which is arranged in a thermally conductive manner on the propagation protection element 3 are substantially constant.

In particular, in this case, a cooling system, not shown in FIG. 1, of the battery module 1 ensures that the temperature of the battery cells 2 is substantially constant.

Furthermore, the profile shown in FIG. 2 has a second region 62 of the operating period 5, within which second region the temperature 4 of the propagation protection element 3 increases over the operating period 5, this possibly being caused by an increase in the temperature of a battery cell 2 which is thermally conductively connected to the propagation protection element 3.

In particular, in this case, the capacity of the cooling system of the battery module 1 is not sufficient to prevent a further increase in the temperature of the battery cell 2.

In addition, the profile shown in FIG. 2 has a third region 63 of the operating period 5, within which third region the temperature 4 of the propagation protection element 3 is substantially constant over the operating period 5.

In this case, a critical value 64 for the temperature 4 has been exceeded at the transition from the second region 62 to the third region 63, so that an endothermic process is executed within the propagation protection element 3, said endothermic process absorbing heat which is given off by the battery cell 2 which is thermally conductively connected to the propagation protection element 3.

As a result, firstly a further increase in temperature within the propagation protection element 3 and secondly also within the battery cell 2 can be prevented.

Therefore, the battery cell 2 can be transferred back to a non-critical state.

A temperature profile of this kind which is represented by a solid line in FIG. 2 can be formed, for example, using a propagation protection element 3 comprising a phase-change material.

It should be noted at this point that it is additionally also possible that the temperature 4 within the third region 63 decreases over the operating period 5, this being intended to be indicated by the dashed line. A temperature profile of this kind can be formed, for example, by a propagation protection element 3 comprising a plurality of substances which react in an endothermic manner to form at least one further substance or by a propagation protection element 3 comprising at least one substance which decomposes to form two further substances.

It should further be noted at this point that the critical value 64 for the temperature 4 represents the critical value for the propagation protection element 3, wherein the endothermic process is executed within the propagation protection element 3 when the critical value 64 is exceeded.

However, in this case, the critical value 64 also corresponds substantially to the safety-critical value for the battery cell 2 which is thermally conductively connected to the respective propagation protection element 3 since, owing to the thermally conductive arrangement of the propagation protection element 3 on the battery cell 2, the conduction of heat should have only a small influence on a difference between the two temperature values.

The invention claimed is:

1. A battery module comprising
    at least one battery cell (2),
    a propagation protection element (3) which is connected in a thermally conductive manner to the battery cell (2) and which is configured such that, when a specific value for a temperature of the at least one battery cell (2) is exceeded, an endothermic process executed within the propagation protection element (3) absorbs heat which is given off by the at least one battery cell (2),
    a temperature sensor (TS) arranged on or within the propagation protection element (3) and configured to identify that the specific value for the temperature has been exceeded, and
    a control unit (CU) programmed to identify, in response to the temperature sensor (TS) identifying that the specific value for the temperature has been exceeded, that the endothermic process within the propagation protection element (3) has been executed.

2. The battery module according to claim 1, characterized in that the propagation protection element (3) is in direct mechanical contact with the at least one battery cell (2).

3. The battery module according to claim 1, characterized in that the propagation protection element (3) contains a phase-change material.

4. The battery module according to claim 1, characterized in that the propagation protection element (3) comprises a plurality of substances which, when the specific value for the temperature of the at least one battery cell (2) is exceeded, react in an endothermic manner with one another to form at least one further substance.

5. The battery module according to claim 1, characterized in that the propagation protection element (3) comprises at least one substance which, when the specific value for the temperature of the at least one battery cell (2) is exceeded, decomposes in an endothermic manner to form at least two further substances.

6. The battery module according to claim 5, characterized in that the propagation protection element (3) comprises a hydroxide.

7. The battery module according to claim 6 wherein the hydroxide is lithium hydroxide, sodium hydroxide, calcium hydroxide, potassium hydroxide or aluminum hydroxide.

8. The battery module according to claim 6, characterized in that
    the propagation protection element (3) partially or completely encapsulates the at least one battery cell (2), or in that the at least one battery cell (2) has an encapsulation within which the propagation protection element (3) is accommodated.

9. The battery module according to claim 5, characterized in that the propagation protection element (3) comprises a carbonate.

10. The battery module according to claim 9 wherein the carbonate is calcium carbonate, lithium carbonate, sodium carbonate or magnesium carbonate.

11. The battery module according to claim 9, characterized in that
    the propagation protection element (3) partially or completely encapsulates the at least one battery cell (2), or in that the at least one battery cell (2) has an encapsulation within which the propagation protection element (3) is accommodated.

12. The battery module according to claim 5, characterized in that the propagation protection element (3) comprises a hydrogen carbonate.

13. The battery module according to claim 12 wherein the hydrogen carbonate comprises sodium hydrogen carbonate.

14. The battery module according to claim 12, characterized in that
    the propagation protection element (3) partially or completely encapsulates the at least one battery cell (2), or in that the at least one battery cell (2) has an encapsulation within which the propagation protection element (3) is accommodated.

15. The battery module according to claim 5, characterized in that the propagation protection element (3) comprises a hydrate salt.

16. The battery module according to claim 15, characterized in that
    the propagation protection element (3) partially or completely encapsulates the at least one battery cell (2), or in that the at least one battery cell (2) has an encapsulation within which the propagation protection element (3) is accommodated.

17. A battery module comprising
    at least one battery cell (2),
    a propagation protection element (3) which is connected in a thermally conductive manner to the battery cell (2) and which is configured such that, when a specific value for a temperature of the at least one battery cell (2) is exceeded, an endothermic process executed within the propagation protection element (3) absorbs heat which is given off by the at least one battery cell (2),
    a pressure sensor (PS) arranged within the propagation protection element (3) and configured to identify a change in pressure in the propagation protection element (3), and
    a control unit (CU) programmed to identify, in response to the pressure sensor (PS) identifying a change in pressure in the propagation protection element (3), that the endothermic process within the propagation protection element (3) has been executed.

18. The battery module of claim 17, wherein the endothermic process produces a gas and wherein the battery module further comprises a degassing valve configured to open when a specific pressure within the propagation protection element is exceeded.

* * * * *